May 18, 1926.

M. ROUX 1,585,210

NAVIGATION APPARATUS

Filed Feb. 8, 1921     3 Sheets-Sheet 1

Inventor:

Max Roux

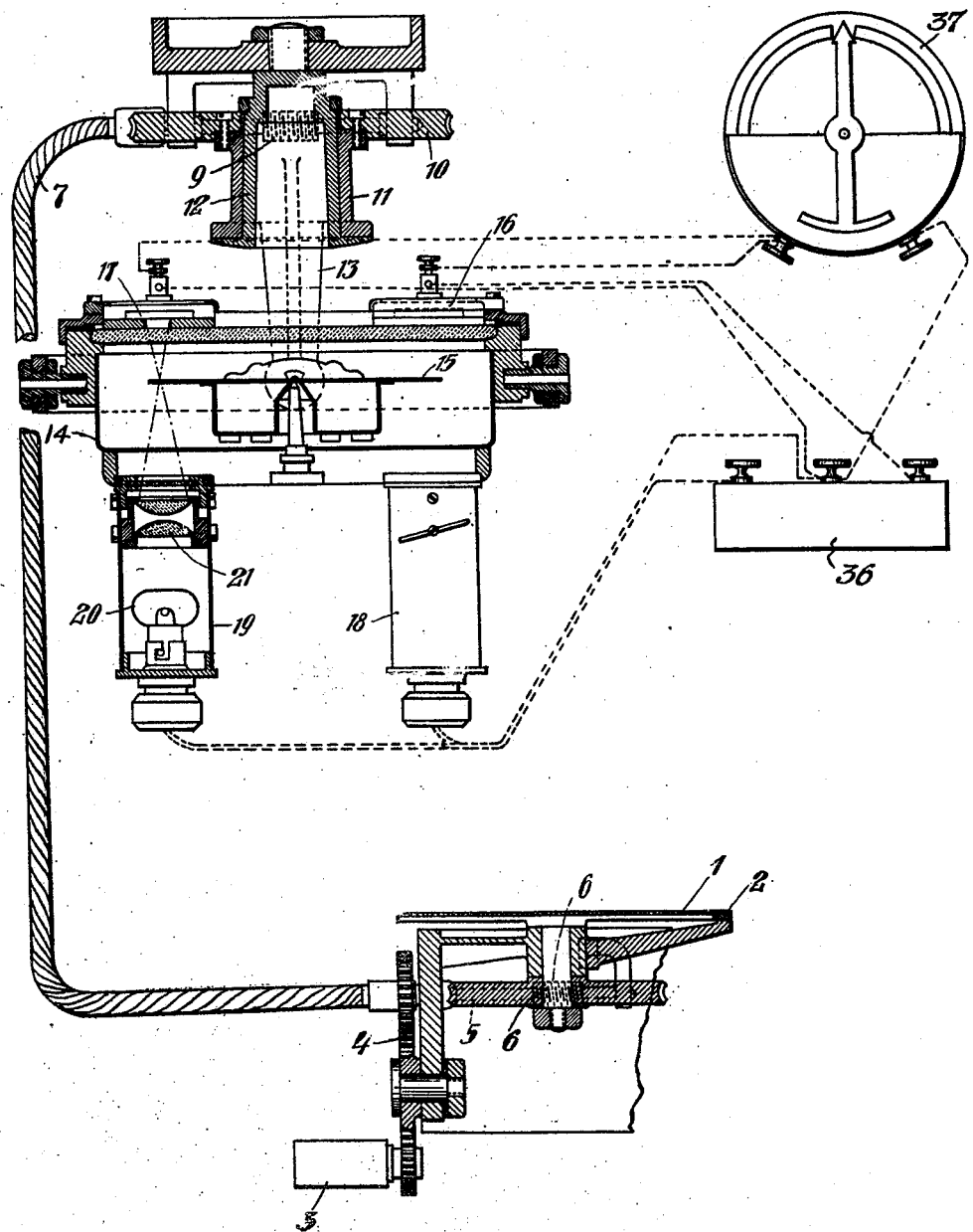

Patented May 18, 1926.

1,585,210

UNITED STATES PATENT OFFICE.

MAX ROUX, OF BERLIN-FRIEDENAU, GERMANY.

NAVIGATION APPARATUS.

Application filed February 8, 1921. Serial No. 443,450.

In the German patent-specification 278,174 a navigating apparatus for aircraft has been described by means of which the flight passenger or observer indicates to the pilot the direction to be followed and which is characterized by the fact that by movement of an indicator playing over a compass card, which the observer adjusts to the point of the compass to be followed, the box of a compass is positively turned in the opposite direction to the same extent, the needle of said box compass, or an arm connected therewith, playing in the manner known between two box contacts and thereby, owing to the impingements thereon, closing one of two current circuits of an electro-magnetic course indicator until the pilot has turned the machine exactly into the direction or course indicated, whereupon the signal circuit is again automatically interrupted and the course indicator returns to its neutral position.

This device described in the above-mentioned German specification is, however, only applicable to large compasses, namely to such where the compass card has sufficient magnetic force to cause a proper closing of the circuit with the contact pieces. In smaller compasses, such as are used in aircraft for example, the magnetic power of the magnetic direction indicating plate is not sufficiently strong to allow the magnetic direction indicating plate to remain in a given position close to one of the contact pieces. Due to the jolt upon an alteration in the course the compass card will spring back and this prevents a proper contact formation.

The object of the present invention is to provide a device working essentially upon the same principle as the above, but which, on the one hand, is materially more sensitive, whilst, on the other hand, the contact formation is not dependent in its action upon the magnetic power of the magnetic direction indicating plate so that, consequently the disadvantages described above are obviated. The special feature of the present invention lies in the fact that, instead of the contacts, two selenium cells are arranged upon the rotary compass box upon one side of the magnetic direction indicating plate whilst, upon the other side of the magnetic direction indicating plate, there lie sources of light which are covered by the magnetic direction indicating plate, which is provided with an incision extending over half the circular periphery, but which upon displacement of the magnetic direction indicating plate allows illumination of one or the other of the selenium cells and thereby causes current to pass through the illuminated cell, so that a suitable indicating device is placed in action by electric means. Further details of the invention are apparent from the following description.

The invention is shown by way of example in a constructional form in the accompanying drawings, wherein:—

Figure 3 is a vertical section through the compass on the line a—a of Figure 1 showing the compass card and its associated parts, the electrical source, and the indicator.

Figure 1:
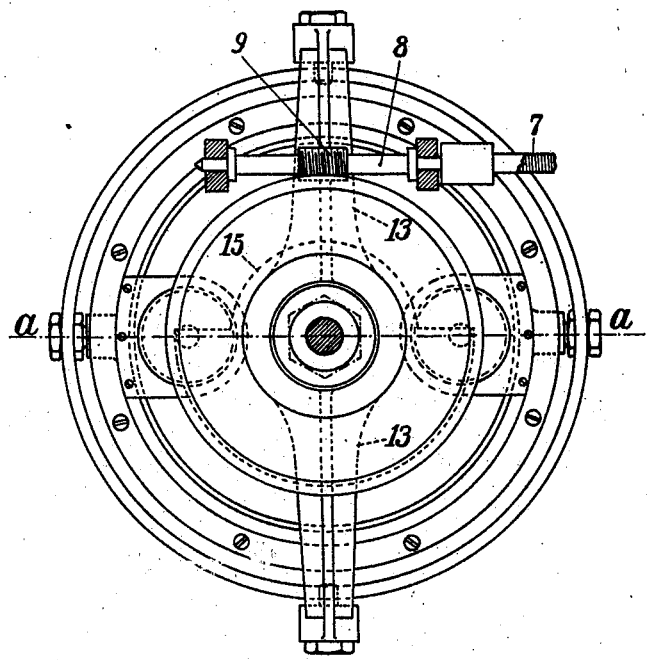
Figure 1 is a plan of the compass used in accordance with the invention.
Figure 2:
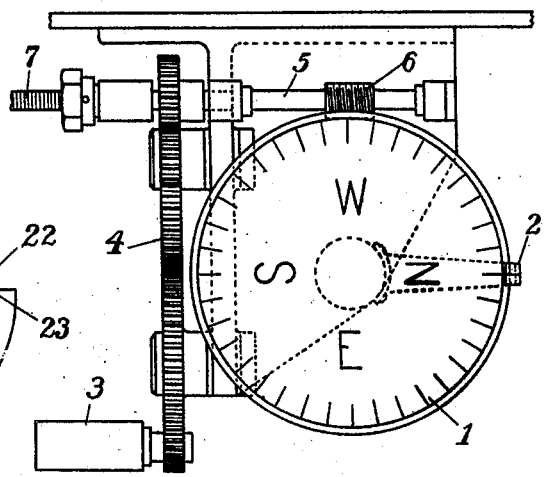
Figure 2 is a plan of the compass card adjusted to the course to be followed, in combination with some associate parts.

As in the German specification mentioned the navigation device consists of three parts, namely, a compass card, the angular displacement of which upon the second part or compass is so transmitted that the compass box is subjected to a similar angular displacement and a third part consisting of any suitable type of distance indicator, which is omitted from the drawings however, as its construction may either be that according to said patent or of any other suitable construction, such a structure is clearly shown in the Fig. 3 wherein 37 is an electrically operable indicating mechanism and 36 is a battery indicated in circuit therewth. These two elements are described more in detail in my Patent Number 1,485,430 of March 4, 1924.

In the drawings 1 is the rotary compass card, which is adjusted with reference to a fixed index 2. This adjustment is effected by means of a handle 3 which, through the medium of a gear wheel 4, turns a shaft 5 which can turn primarily the compass card through the medium of a worm 6, but which at the same time is in connection with the compass mechanism by means of a flexible shaft 7. On turning the handle 3 therefore as assumed in the German specification mentioned either the observer, or the pilot himself, if he is flying unaccompanied, can adjust the course as found necessary with the aid of his compass. Finally, it is also possible to prolong the shaft 7 by the attachment thereto of a flexible shaft on the other side and also to add a second or even third compass card, whereby the possibilty of also rendering the momentary position of the compass card visible at other points, which may be desirable in large battle planes or in similar classes of utilization is afforded.

The flexible shaft 7 connects at the compass with a shaft portion 8 which, by means of a worm 9, turns a worm wheel 10 mounted upon a sleeve 11, which is pivotally mounted upon a dependent pin 12, and in its turn carries the yoke 13, which supports the compass box 14 in a Cardan-like manner. By means of the Cardan-like suspension of the compass it can thus be rotated by the arrangement described.

Now in the ordinary constructional example two selenium cells 16 and 17 are arranged above the magnetic direction indicating plate 15, whilst two sources of light 20 are mounted below the magnetic direction indicating plate 15 in cases 18 and 19. In the example shown in Fig. 3, the sources of light are electric incandescent lamps which are fed with current from a battery contained in the casing 36. The arrangement of these parts as described may also be effected inversely, that is to say, in suchwise that the selenium cells are mounted below, and the sources of light above the magnetic direction indicating plate. By means of condensers 21 which are located in the corresponding pipe portions 18 and 19 a sharp or clearly defined image of the source of light 20 is produced in the plane of the magnetic direction indicating plate 15. Now, as may be seen from Figures 1 and 4, the magnetic direction indicating plate 15 has an incision 22 extending over nearly one half of its circular periphery. This incision is so selected that, when the aircraft flies in the direction desired, the radial edges 23 of the magnetic direction indicating plate cover the sources of light 20 located in the two pipes 18 and 19, so that in this position an illumination of the selenium cells 16 and 17 is prevented. In this case therefore a passage of current to the course indicator is prevented and the latter will remain standing in its normal position. As soon, however as the compass box 14 is turned somewhat by the mechanism which turns the compass card 1, the two sources of light 20 adopt a position in which either the one or the other is no longer covered by the edge of the magnetic direction indicating plate 15 so that, consequently, the exposed source of light now illuminates the corresponding selenium cell and can excite it so that the passage of currents take place through it and the course indicator can, therefore, be so actuated that the indicator or needle causes a corresponding throw or deflection and shows the pilot the direction in which he has to turn as illustrated by the indicator 33 in Fig. 5. In all cases of utilization the magnetic direction indicating plate 15 thereby remains visible from above and the compass per se can also be used in the normal manner.

As already mentioned there can be used as a direction or course indicator either the device according to the German specification 278,174 or any other indicating device can also be used and, finally, other arrangements can also be introduced to make the actual course to be pursued known to the pilot. Especially it becomes possible to transmit such signs by means of special incandescence signal lamps, the bulbs of which may be differently colored; such an addition is very useful especially in night flights. The use of the condensers 21 is important, for the reason that only in this way is it possible to create the images or pictures of the sources of light 20 in the immediate vicinity of the radial edges 23 of the magnetic direction indicating plate 15, so that even a slight deviation in the direction of flight leads to the exposure of one of the sources of light and permits of the illumination of the corresponding selenium cells. Morever by this construction unfavorable and undesirable illumination of the selenium cells, especially by diffused light, is prevented.

In certain cases and with suitable indicating devices it may, at the same time, also be advantageous to so constitute or locate the sources of light that the image produced by the condenser in the plane of the magnetic direction indicating plate 15 does not appear as a point or dot but has a certain expansion transverse to the radius of the magnetic direction indicating plate 15, that is to say transversely to the edge 23 thereof. This can for example, be effected by so situating the incandescent filament of the source of light that by the formation of the images of the sources of light it lies transversely to the radial edge. The result of this is that when the compass box is turned upon alteration in the course, the source of light is gradually exposed by the edge 23 of the magnetic direction indicating plate 15. Consequently the illumination of the corresponding selenium cells 16 and 17 is not effected instantaneously to the maximum degree, but first a weak illumination takes place primarily through a small exposed part of the source of light and upon a greater deviation from the course, a stronger illumination of the selenium cell takes place. Corresponding to this graduated exposure to light the passage of current through the corresponding selenium cells will thereby also be of different strength. If, in combination with this formation an indicating device be used which enables this variable current intensity to be read off by a more or less considerable deflection, then the pilot has a means for determining whether he has deviated considerably or only slightly from the prescribed course.

Figure 5:
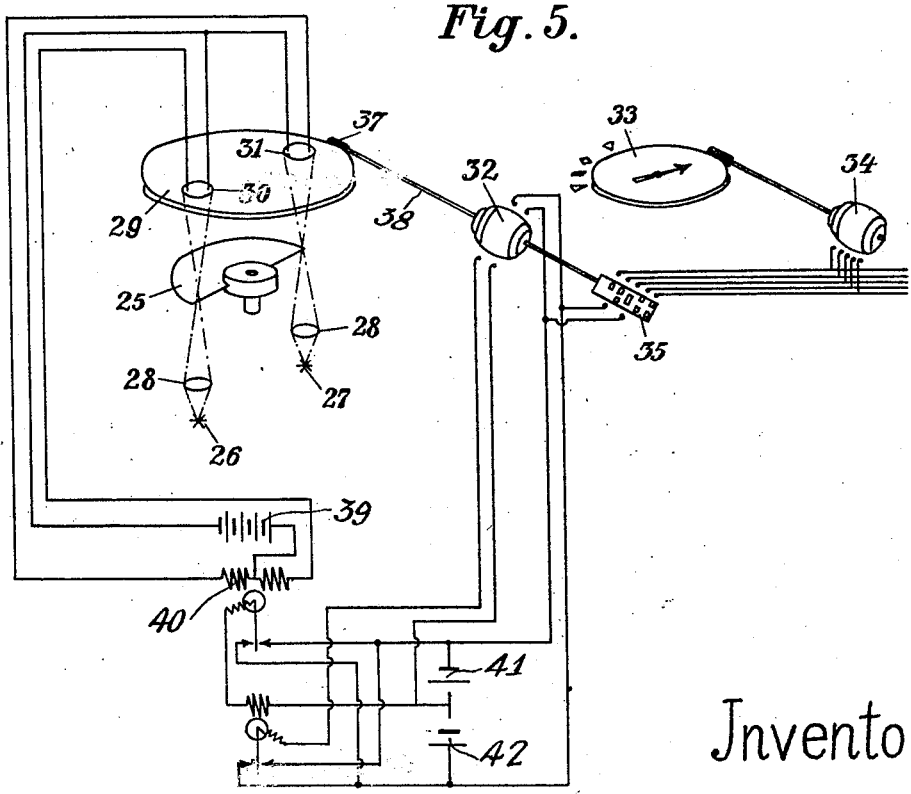
Figure 5 is a diagrammatical illustration of the compass mechanism (on the left), an indicating device (on the right), electromotors for both, and the wiring-diagram, inclusive the battery and relays.

The principle described above can, however, also be employed in the reverse manner, in order to transmit the position of the compass to indicating devices which are intended to give the actual position of the compass. In the case of such so-called compass transmission devices contacts have hitherto exclusively been used which, by means of a contact piece attached to the magnetic direction indicating plate, cause passage of the current in one or the other direction and then actuate the indicating devices by means of magnets or also by means of synchronously running motors. Owing to the contacts, the drawbacks and difficulties, mentioned previously, are also present. These, however, can also be avoided by the employment of the selenium cells. Figure 5 shows diagrammatically such a compass transmission in a type already known in itself, but employing the principle described above.

Figure 4:
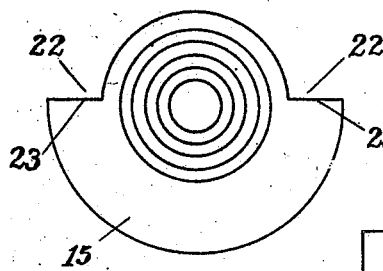
Figure 4 is a plan of the magnetic direction indicating plate.

The semi-circular magnetic direction indicating plate 25 (Fig. 5) is a substitute for the similarly shaped disk 15 (Figs. 3 and 4). Above this plate is arranged a circular disk 29, which is connected with the compass casing and provided with two diametrically opposite apertures filled up with selenium cells 30 and 31. Normally, the position of the disk 29, or more precisely, of the selenium cells is such that a line assumed to connect their centers extends exactly parallelly to the straight edge of the disk 25.

Below the parts mentioned are two lenses 28 and below these two sources of light 26 and 27, preferably electric incandescent lamps, the arrangement of which corresponds to that of the selenium cells, so that a movement of the disk 25 will cause the cut-out portion thereof to be disposed between the lamps and the cells, whereby the rays from the lamps will be projected directly on the selenium cells.

The circular disk 29 has a cogged periphery and forms a worm wheel which meshes with a worm 37 secured to the shaft 38 of an electromotor 32 by means of which the disk 29 can be rotated in one or the other direction.

The selenium cells are inserted into circuits containing a battery 39 and a relay 40 by which one or the other of two batteries 41 and 42 is caused to supply current to the electromotor 32 and cause this to rotate in such a direction that the disk 29 is turned back into its former position when its position relatively to the disk 25 has been altered.

This occurs at every deviation of the aircraft etc. to the right or to the left. The disk 25 which is subject to magnetic direction does not turn to the right or to the left, but the other parts turn relatively to that disk. In the normal position, as in Fig. 5, the straight edge of the disk 25 intersects the pencils of rays projecting forth from the lamps 26 and 27 and none of the selenium cells is excited. But when the disk 29 turns relatively to the disk 25, one or the other selenium cell is excited, in consequence whereof the appertaining motor circuit is closed, the direction of the current being then such, that the motor turns the worm gear in such a direction, that the disk 29 is turned back into its former position relatively to the disk 25. This position having been attained, the straight edge of the disk 25 intersects again the pencils of the rays whereby the active selenium cell is rendered inactive, the appertaining circuit being, thus, interrupted and the motor 32 brought to a standstill.

In the example shown the motor shaft 38 carries a rotary switch 35 by which another motor 34 can be thrown into, and out of, circuit. This additional motor is fed by the same batteries which supply the motor 32 with current, and the connections are such that the direction of rotation of the motor 34 corresponds to that of the motor 32. Also the motor 34 turns a disk 33 in one or the other direction, and there are marks permitting to ascertain the extent of the partial rotation at the time being. The disk 33 forms a kind of substitute for the disk 29, in so far as it is possible to judge from its position relatively to the marks the degree of the deviation from the straight course to the right or to the left. Of course, two or more, instead of only one, disks 33 with their appurtenances may be employed in connection with the combination and arrangement of parts shown in the left hand half of Fig. 5.

The type of such indicating devices and also the means for actuating them, more especially by synchronously running motors, are already known. Here the special feature lies in the use of the selenium cells 30 and 31 which with interposition of the half magnetic direction indicating plate 25, are only illuminated when the disc 39 experiences an angular displacement due to an alteration in the course. Hence in this case the operation of the whole device is also independent of the usual contacts which, hitherto, have lead to serious drawbacks in connection with such compass transmissions. The scheme coming into use with such a device, and which does not belong further to the subject matter of the invention can be so constituted as to comply with the conditions existing in each particular case.

I claim:—

1. In a navigation apparatus for air craft, the combination with a compass casing, of a fixed support, means by which the compass casing is rotatably mounted on the support, an indicating device having an electrically operable pointer, the compass casing containing two sources of light and two selenium cells, said cells being arranged to receive light from said sources, and a magnetic direction indicating plate, said plate being arranged between said sources of light and the selenium cells and having an incision extending over one-half of its circular periphery, electrical conductors connecting said selenium cells with the indicating device, an electric source for passing current through one or the other of the selenium cells to the indicating device whereby to actuate the electrically operable pointer on said indicating device, when the displacement of the said indicating plate causes the illumination of one of the selenium cells by corresponding source of light.

2. In a navigation apparatus the combination with a compass casing, of a fixed support, means by which the compass casing is rotatably mounted on said support, an indicating device having an electrically operable pointer, the compass casing containing two sources of light and two selenium cells, said cells being arranged to receive light from said sources, a magnetic direction indicating plate, said plate being arranged between said sources of light and the selenium cells, and having an incision extending over one-half of its circular periphery, a lens system between each of the sources of light and said indicating plate for concentrating the rays of the sources of light and producing an image of each of these sources in the plane of the indicator plate, electrical conductors connecting said selenium cells with the indicating device for causing electric current to pass from one of the selenium cells to the indicating device, whereby to actuate the electrically operable pointer in said indicating device for indicating the orientation of the air craft when one of the selenium cells is illuminated by a corresponding source of light upon the displacement of the indicating plate.

3. In a navigation apparatus for air craft the combination with a compass casing, of a fixed support, means by which the compass casing is rotatably mounted on said support, an indicating device having an electrically operable pointer, the compass casing containing two sources of light and two selenium cells, the said cells being arranged to receive light from said sources, and a magnetic direction indicating plate, said plate being arranged between the sources of light and the selenium cells and having an incision extending over one-half of its circular periphery, said sources of light lying transversely of the radial edges of the incision of the indicating plate, a lens system between each of the sources of light and said indicating plate for concentrating the rays of the sources of light and producing an image of each of these sources in the plane of the indicating plate, electrical conductors connecting the said selenium cells with the indicating device, an electric source for causing an electric current to pass from one or the other of said selenium cells to the indicating device whereby to actuate the electricably operable pointer in said indicating device for indicating the orientation of the aircraft when one of the selenium cells becomes illuminated by a corresponding source of light upon relative displacement of said indicating plate and compass casing.

4. In a navigation apparatus for air craft the combination with a compass casing, of a fixed support, means by which the compass casing is rotatably mounted on said support, an indicating device having an electrically operable pointer, the compass casing containing two sources of light and two selenium cells, the said cells being arranged to receive light from said sources and a magnetic direction indicating plate, said plate being arranged between the sources of light and the selenium cells, and having an incision extending over one-half its circular periphery, a lens system between each of said sources of light and the said indicating plate for concentrating the rays of the sources of light, so that an image of the source of light is produced in the plane of the indicating plate, electrical conductors connecting said selenium cells with the indicating device whereby to actuate the electrically operable pointer in said indicating device for indicating the orientation of the air craft, and an electric source for causing an electric current to pass from one or the other of the selenium cells to the indicating device, when one of the selenium cells becomes illuminated by a corresponding source of light on relative displacement of the indicating plate and compass casing.

5. In a navigation apparatus for air craft the combination with a compass casing, of a fixed support, means by which the compass casing is rotatably mounted on said support, an indicating device having an electrically operable pointer, the compass casing containing two sources of light and two selenium cells, said cells being arranged to receive light from said sources, and a magnetic direction indicating plate, said plate being arranged between the said sources of light and the selenium cells and having an incision extending over one-half its circular periphery, a lens system between each of said sources of light and said indicating plate for concentrating the rays of the sources of light, and producing an image of each of said sources in the plane of the indicating plate, the means whereby the said compass casing is rotatably supported being Cardan-like, and the support for said means bearing a drive member which is adapted to turn said means, means in engagement with said drive member and connected with the indicating device, electrical conductors for connecting the said selenium cells with the indicating device, and an electric source for passing an electric current from one or the other of said selenium cells to the indicating device, when the said selenium cell becomes illuminated by a corresponding source of light through the rotative displacement of said indicating plate and compass casing whereby to actuate means on said indicating device for indicating the orientation of the air craft.

In testimony whereof I have affixed my signature.

MAX ROUX.